US012587523B2

(12) United States Patent
Maddukuri

(10) Patent No.: US 12,587,523 B2
(45) Date of Patent: Mar. 24, 2026

(54) DECENTRALIZED IDENTIFIER BASED AUTHENTICATION WITH VERIFIABLE CREDENTIALS

(71) Applicant: American Express Travel Related Services Company, Inc., New York, NY (US)

(72) Inventor: Ajay Babu Maddukuri, Phoenix, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 276 days.

(21) Appl. No.: 18/454,039

(22) Filed: Aug. 22, 2023

(65) Prior Publication Data

US 2025/0071108 A1     Feb. 27, 2025

(51) Int. Cl.
*H04L 29/06*     (2006.01)
*H04L 9/32*     (2006.01)
*H04L 9/40*     (2022.01)

(52) U.S. Cl.
CPC ........ *H04L 63/0838* (2013.01); *H04L 9/3242* (2013.01); *H04L 9/3271* (2013.01)

(58) Field of Classification Search
CPC . H04L 63/0838; H04L 9/3242; H04L 9/3271; G06N 20/00; G06F 2221/2103
See application file for complete search history.

(56) References Cited

U.S. PATENT DOCUMENTS

| | | | |
|---|---|---|---|
| 7,051,209 B1 * | 5/2006 | Brickell | H04L 9/3226 |
| | | | 713/184 |
| 10,797,871 B1 | 10/2020 | Mccormack et al. | |
| 11,552,953 B1 * | 1/2023 | Avadhanam | H04L 63/102 |
| 2011/0177484 A1 * | 7/2011 | Morgan | G09B 5/065 |
| | | | 434/322 |

(Continued)

FOREIGN PATENT DOCUMENTS

| | | | | |
|---|---|---|---|---|
| AU | 1631200 A | * | 6/2000 | H04L 9/0822 |
| DE | 102021112754 A1 | * | 11/2022 | H04L 63/0884 |

(Continued)

OTHER PUBLICATIONS

Jules White et al: "A Prompt Pattern Catalog to Enhance Prompt Engineering with ChatGPT", arxiv.org, Cornell University Library, 201 Olin Library Cornell University Ithaca, NY 14853, Feb. 21, 2023.

*Primary Examiner* — Shawnchoy Rahman
(74) *Attorney, Agent, or Firm* — Thomas Horstemeyer, LLP

(57) ABSTRACT

Disclosed are various approaches for authenticating users using verifiable credentials. An enrollment request is received from a browser. In response to the enrollment request, a set of authentication questions can be selected. The set of authentication questions can then be sent to the browser. Next, a set of answers to a subset of the set of authentication questions is received. Subsequently, a decentralized identifier communication (DIDComm) protocol connection is established with a wallet application. Then, a verifiable credential that represents the set of answers to the subset of the set of authentication questions is issued to the wallet application.

20 Claims, 7 Drawing Sheets

(56) References Cited

U.S. PATENT DOCUMENTS

| | | | | |
|---|---|---|---|---|
| 2014/0189829 | A1* | 7/2014 | McLachlan | G06Q 20/4014 |
| | | | | 726/6 |
| 2017/0070510 | A1* | 3/2017 | Ramalingam | H04L 63/08 |
| 2019/0141041 | A1* | 5/2019 | Bhabbur | H04L 9/3228 |
| 2020/0244659 | A1 | 7/2020 | Kunda et al. | |
| 2023/0177495 | A1* | 6/2023 | Duffy | G06Q 20/3674 |
| | | | | 705/76 |
| 2025/0037112 | A1* | 1/2025 | Maddukuri | G06Q 20/3276 |
| 2025/0063029 | A1* | 2/2025 | Wen | H04L 63/08 |

FOREIGN PATENT DOCUMENTS

| | | | | | |
|---|---|---|---|---|---|
| EP | | 4092548 | A1 * | 11/2022 | H04L 9/0894 |
| EP | | 4092958 | A1 | 11/2022 | |
| WO | WO-2004075528 | A2 * | 9/2004 | G06Q 30/02 |
| WO | WO-2023278714 | A1 * | 1/2023 | G06Q 20/40 |

* cited by examiner

100a

100b

100c

100g

100h

100i

103e

The website wants to know the
name of your favorite pet.

Approve        Deny

100h

103f

The website wants a one-time
password.

Approve        Deny

DECENTRALIZED IDENTIFIER BASED AUTHENTICATION WITH VERIFIABLE CREDENTIALS

BACKGROUND

Traditional user authentication with a username and a password has steadily become less secure over time. As computational capabilities increase, user passwords can often be guessed using various techniques. Although users can continue to make passwords longer and more difficult to guess, such passwords are both difficult to remember and, eventually, become easier to guess as computational capabilities of computer hardware increase.

Moreover, centralized storage of passwords or other authentication data leaves users vulnerable to a single point of failure. In the event that a data breach occurs, authentication data such as password hashes, usernames, and other authentication credentials could be leaked to third parties. These third parties could use the leaked credentials to gain access to user accounts or systems.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figures 1A, 1B, 1C:
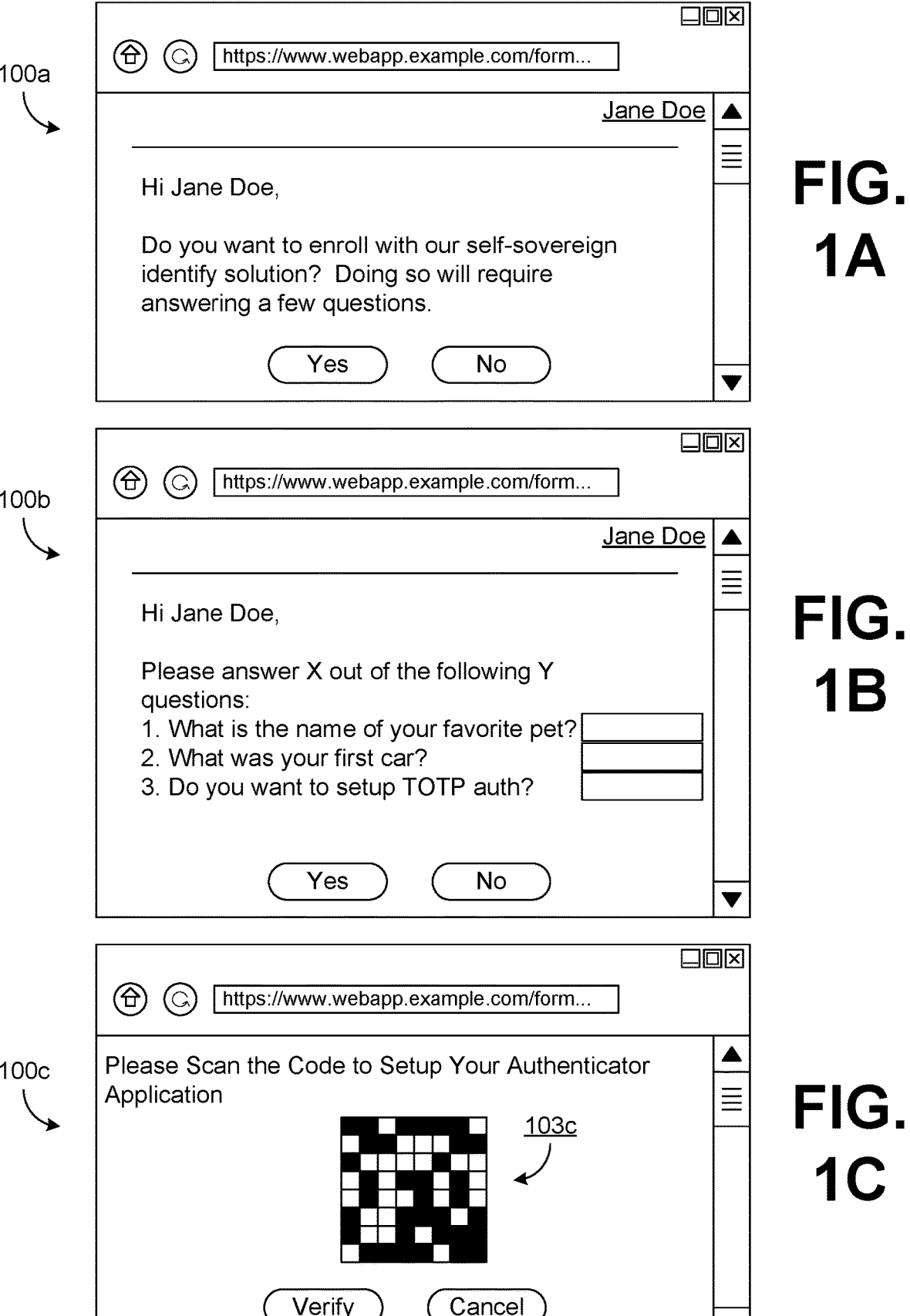
FIGS. 1A-J are pictorial diagrams of example user interfaces according to various embodiments of the present disclosure.

Disclosed are various approaches for using decentralized identifiers and verifiable credentials to provide multifactor authentication. Multifactor authentication is often provided by a single, centralized point or entity. For example, an individual website owner or operator could provide a second factor of authentication for logon or account recovery purposes (e.g., one-time passwords, personal questions, etc.). However, a compromise of the website owner or operator would potentially expose secondary authentication factors for all of the users of the website. Similarly, single-sign on (SSO) systems could provide a second factor of authentication, but a compromise of the SSO system would potentially allow for attackers to access multiple websites or resources for the same account.

Accordingly, various embodiments of the present disclosure decentralize secondary authentication factors to minimize the security risks associated with a data breach. Through the use of verifiable credentials, individuals can provide their own authentication mechanisms that can be shared with individual websites or web applications. The verifiable credentials could be used as a secondary factor of authentication or as a primary factor of authentication. Moreover, in the event that a website or web application were compromised, the authentication credentials for the user would not be leaked. Moreover, the compromise of a single user's authentication credentials would also be limited to that user, unlike centralized systems where a compromise of a single user's authentication credentials could imply that the entire authentication system has been compromised.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

FIGS. 1A-E depict a sequence of user interface diagrams for user interfaces 100a-e (collectively the "user interfaces 100" and generically a "user interface 100"), respectively. The user interfaces 100 depict one example of a user experience with various embodiments of the present disclosure. Other user interfaces 100 and other user experiences are also encompassed by the various embodiments of the present disclosure.

For example, FIGS. 1A through 1E depict an example of a portion of an enrollment process for users interacting with various embodiments of the present disclosure. For example, in FIG. 1A, a user could request to enroll with a self-sovereign identify (SSI) solution provided by an authentication service using user interface 100a.

In response to submitting the request, the user could be presented with user interface 100b, which prompts the user to supply answers to various questions provided by an issuing service. Some of these questions could be personal questions that only the user would be likely to know the answer to. Other questions could be questions to prompt the user to setup additional authentication mechanisms, such as a one-time password (OTP) authentication scheme (e.g., a time-based one-time password (TOTP) algorithm or a hash-based message authentication code (HMAC) one-time password (HOTP) algorithm).

If the user were to indicate that he or she wanted to setup one-time password (OTP) authentication, then the user could be presented with user interface 100c. Here, a user could scan with an authenticator application (e.g., GOOGLE AUTHENTICATOR, MICROSOFT AUTHENTICATOR, SYMANTEC VIP ACCESS, OKTA VERIFY, TWILIO AUTHY, etc.) a matrix bar code 103c (e.g., a quick response (QR) code) that encodes a seed value for the OTP algorithm. The user could then indicate that the matrix bar code 103c has been scanned (e.g., by clicking, pressing, or selecting a "Verify" button or similar user interface element). In response, the user could be presented with user interface 103d, where a user could enter subsequent codes generated by his or her authentication application to verify that the authentication application has been correctly configured.

Figures 1D, 1E, 1F:
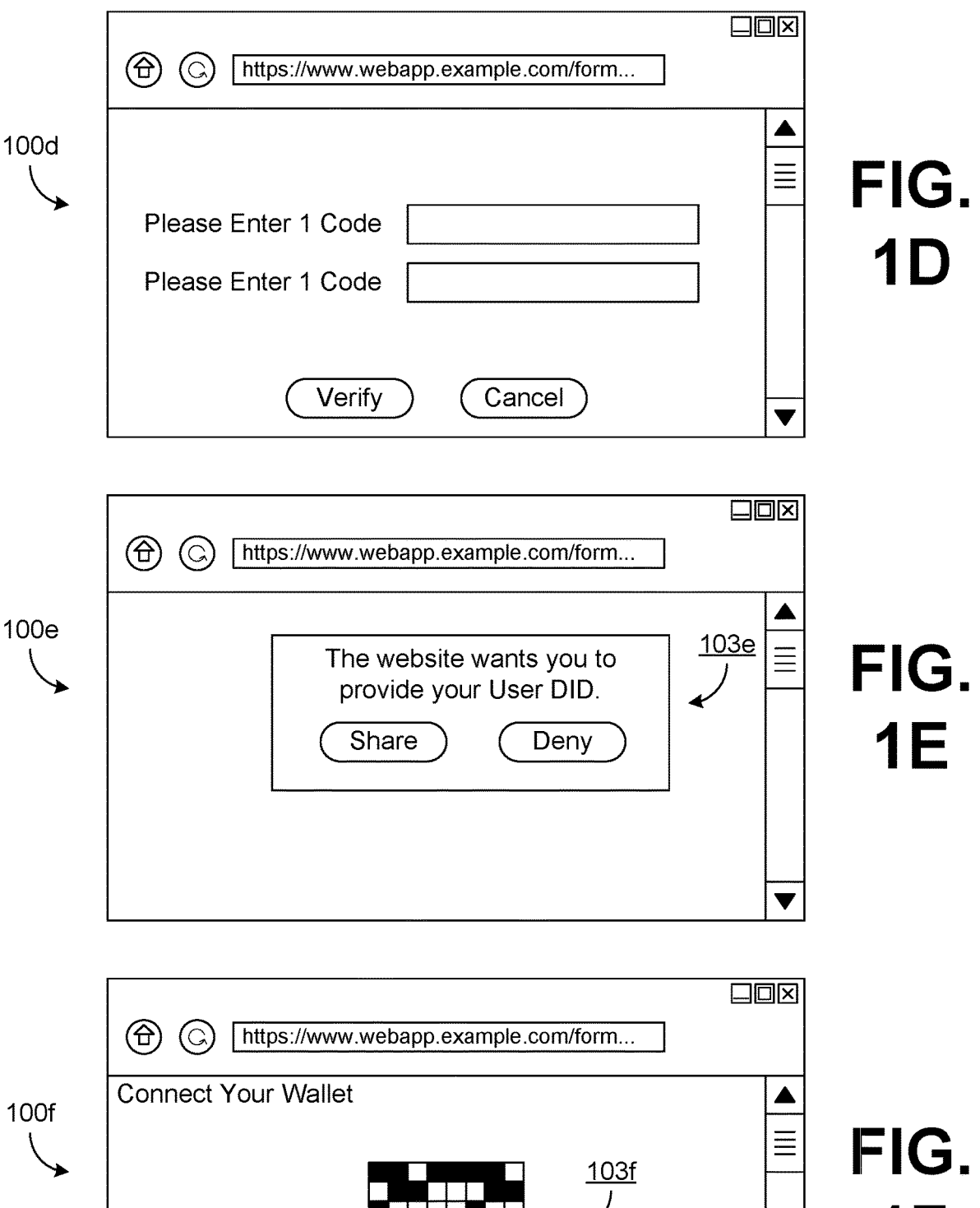
Figures 1G, 1H:
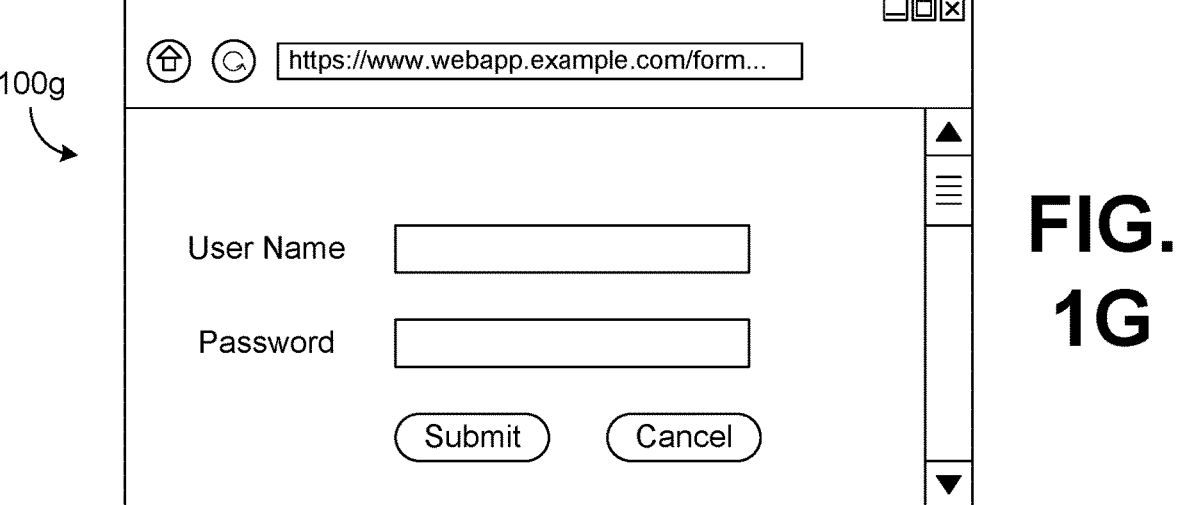
Figures 1I, 1J:
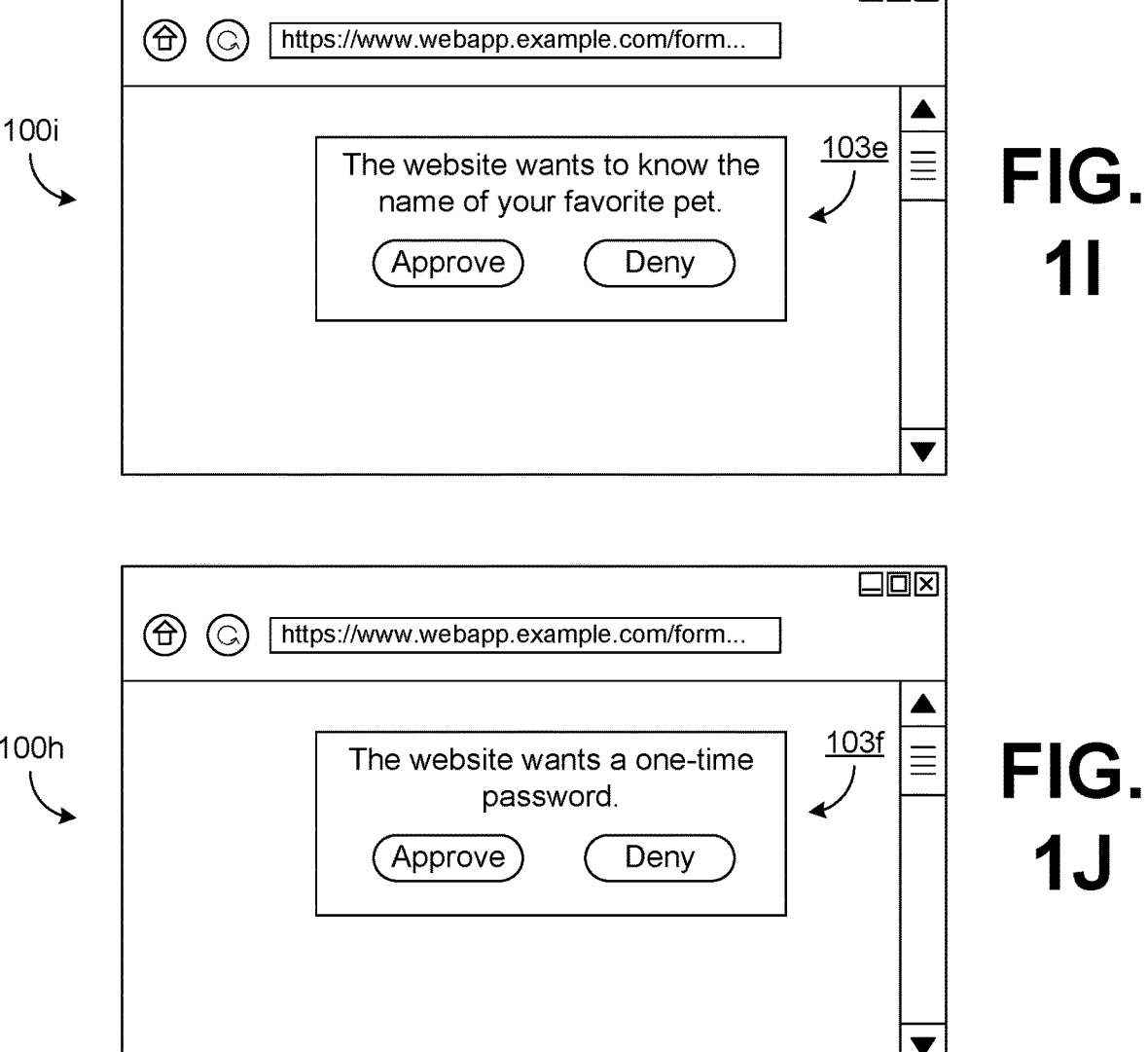

Once the user has provided answers to the questions presented in FIG. 1B, as well as optionally configured his or her authentication application as illustrated in FIG. 1C or FIG. 1D, the user could be presented with the user interface 100f as depicted in FIG. 1E. Here, the user could be provided with a prompt 103e to share a user's decentralized identifier (DID) with the issuer service. This could be a peer DID generated by the wallet application of the user or a DID issued by another party or service. If the user choose to share a DID, the user could then be presented with a user interface of a wallet application to select which DID to share. However, in some implementations, the user might not be provided with the user interface 100e. For example, the issuer could create a DID for use with any verifiable credentials it issues to the user. In such situations, the user would not be prompted to share a DID of his or her choosing.

For user interface 100f in FIG. 1F, the user could be provided with information necessary to establish a decentralized identifier communication (DIDcomm) protocol connection between his or her wallet application and the service he or she is enrolling with. For example, the user could be presented with a matrix bar code 103f (e.g., a quick response (QR) code), which the user could scan using his or her wallet application to establish a connection, thereby allowing for the transfer of any verifiable credentials between the issuing service and the user's wallet application.

FIGS. 1G-J depict another sequence of user interface diagrams for user interfaces 100g-j (collectively the "user interfaces 100" and generically a "user interface 100"), respectively. The user interfaces 100 depict one example of a user experience with various embodiments of the present disclosure. Other user interfaces 100 and other user experiences are also encompassed by the various embodiments of the present disclosure.

For example, a user could be presented with a user interface 100f when a user wishes to authenticate with a web site, web application, or other system or service. The user interface 100g could prompt the user to provide his or her username or other unique user identifier. In some implementations, the user could also be prompted to provide a password.

As another example, a user could instead be presented with a user interface 100h, where the user is prompted to share his or her decentralized identifier (DID) that identifies the user to the website or web application. If the user selects to share his or her DID using the prompt 103h, then the user could use his or her wallet application to select the DID to use to identify himself or herself.

After the user has identified himself or herself to the website or web application, the user could be prompted to share identifying information with the website or web application. For example, the user could be prompted to share the answers to one or more questions, as depicted in the user interface 100i of FIG. 11. Here, the user could be presented with a prompt 103i to share the answer stored in the verifiable credential that had been previously issued to the user. If the user allows the answer to be shared, then the user could be authenticated. As another example, the user could be prompted to share a one-time password using a seed value stored in the verifiable credential, as depicted by the user interface 100j of FIG. 1J. If the user allows the one-time password to be shared, then the wallet application could generate and supply the one-time password to the website or web application to authenticate the user.

Figure 2:
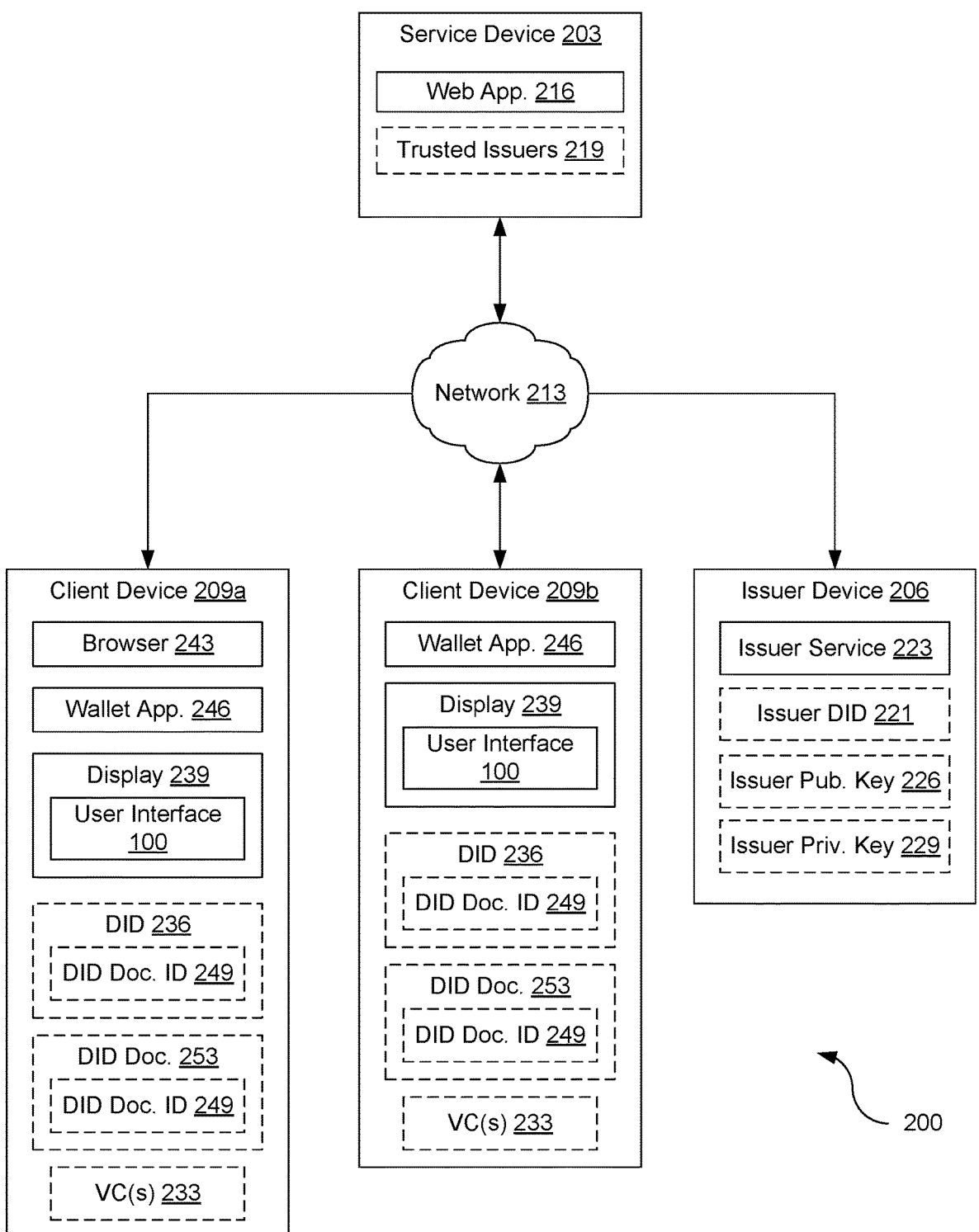
FIG. 2 is a drawing of a network environment according to various embodiments of the present disclosure.

With reference to FIG. 2, shown is a network environment 200 according to various embodiments. The network environment 200 can include one or more computing devices that include a processor, a memory, and/or a network interface. These computing devices can include a service device 203, an issuer device 206, one or more client devices 209 (e.g., client device 209a and client device 209b), and potentially other computing devices.

One or more of these computing devices could be located within a computing environment. Such a computing environment could employ a plurality of computing devices that can be arranged in one or more server banks or computer banks or other arrangements. Such computing devices can be located in a single installation or can be distributed among many different geographical locations. For example, the computing environment can include a plurality of computing devices that together can include a hosted computing resource, a grid computing resource or any other distributed computing arrangement. In some cases, the computing environment can correspond to an elastic computing resource where the allotted capacity of processing, network, storage, or other computing-related resources can vary over time.

These computing devices can be in data communication with each other via a network 213. The network 213 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 213 can also include a combination of two or more networks 213. Examples of networks 213 can include the Internet, intranets, extranets, virtual private networks (VPNs), and similar networks.

A service device 203 can represent one or more computing devices that host web sites, web pages, and/or web applications. Accordingly, a service device 203 could be configured to host or provide a web application 216, as well any ancillary services or programs required to host or provide the web application 216, such as web servers or services, database servers or services, etc. A service device 203 could also store a list of one or more trusted issuers 219, according to various embodiments of the present disclosure.

A web application 216 can include any software application accessible using a web browser or similar software. A web application could include, for example, a set of web pages that, when accessed by a user, allow a user to view or submit different types of data or perform different actions or operations. Some of the web pages provided by the web application to the browser on the user's device could include embedded scripts that could be executed to provided enriched client-side functionality and/or communicate with the web application on the service device 203 asynchronously.

The trusted issuers 219 can represent a list of one or more issuer devices 206 or issuer services 223 that are trusted by the web application 216. For example, a service device 203 or web application 216 could be configured to only trust verifiable credentials 233 issued by particular issuers who are known to be trustworthy. For example, a trusted issuer of verifiable credentials 233 might be trusted to determine the veracity of any information included in a verifiable credential 233 that it issues. Therefore, the service device 203 or web application 216 could be configured to only or preferentially rely on verifiable credentials issued by issuer devices 206 or issuer services 223 listed in the trusted issuers 219.

Issuer devices 206 or issuer services 223 could be identified among the trusted issuers 219 in a variety of manners. For example, the issuer public key 226, or a fingerprint of the issuer public key 226, associated with an issuer service 223 or issuer device 206 could be used as an identifier for a trusted issuer 219. As another example, a unique identifier for the operator of the issuer device 206 or issuer service 223 could be used as an identifier for a trusted issuer 219. An example of such a unique identifier would be an issuer decentralized identifier (DID) 221 or a fingerprint of an issuer public key 226. The issuer DID 221 can be implemented using various standards, such as a version of the World Wide Web Consortium's (W3C's) Decentralized Identifier (DID) standard.

An issuer device 206 can represent one or more computing devices that are used to issue verifiable credentials 233. An issuer device 206 could be configured to host or execute an issuer service 223. An issuer device 206 could also store or have access to an issuer public key 226 and/or an issuer private key 229. The issuer device 206 and/or issuer service 223 could be operated by a variety of entities, including government agencies and corporate entities. For example, government agencies that are responsible for issuing government identification documents (e.g., driver's licenses, passports, etc.) could operate issuer devices 206 and/or issuer services 223 in order to issue verifiable credentials 233 to individuals. As another example, corporations that have extensive, verified knowledge about the identity of customers or individuals (e.g., data brokers, identity brokers, financial institutions, etc.) could operate issuer devices 206 and/or issuer services 223 in order to issue verifiable credentials 233 to individuals.

The issuer service 223 could be executed to respond to requests to issue verifiable credentials 233. For example, an issuer service 223 could receive a request to issue a verifiable credential from a client device 209. The request could include a specific decentralized identifier (DID) 236 for the verifiable credential 233 to be associated with and/or information identifying the user or individual associated with the DID 236. The issuer service 223 could then issue a verifiable credential 233 in response, which could be signed by the issuer private key 229 to allow third parties to determine the authenticity of the verifiable credential 233.

The issuer public key 226 and the issuer private key 229 could be parts of a public-private or asymmetric cryptographic key-pair used by the issuer service 223 when issuing verifiable credentials 233. The issuer private key 229 could be used to sign any verifiable credentials 233 issued, allowing third parties to determine the authenticity of the verifiable credential 233. The issuer public key 226 could be provided to any third party that requested the issuer public key 226 in order to verify that a verifiable credential 233 signed by the issuer private key 229 is genuine. The issuer public key 226, or a fingerprint of the issuer public key 226 could also be used to uniquely identify an issuer device 206 or issuer service 223 with respect to other issuer devices 206 or issuer services 223.

A client device 209 is representative of one or more client devices 209 that can be coupled to the network 213, such as client device 209a and client device 209b (collectively the "client devices 209" and generically a "client device 209"). A client device 209 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. A client device 209 can include one or more displays 239, such as liquid crystal displays (LCDs), gas plasma-based flat panel displays, organic light emitting diode (OLED) displays, electrophoretic ink ("E-ink") displays, projectors, or other types of display devices. In some instances, the display 239 can be a component of a client device 209 or can be connected to a client device 209 through a wired or wireless connection.

A client device 209 can be configured to execute various applications such a browser 243, a wallet application 246, or other applications. The browser 243 can be used to access and/or interact with web pages or websites, such as those provided by or used when interacting with a web application 216. Examples of browsers 243 include GOOGLE CHROME®, APPLE SAFARI®, MICROSOFT EDGE®, and MOZILLA FIREFOX®. The wallet application 246 can represent any application that allows a user to manage his or her digital identity, including generating or issuing DIDs 236; creating and/or storing DID Documents 249; requesting, obtaining, or sharing verifiable credentials 233; revoking or invalidating DIDs 236 or verifiable credentials 233; etc. The wallet application 246 could be a separate, standalone application or, in some implementations, could be an extension or plugin this is run by the browser 243.

A decentralized identifier (DID) 236 can correspond to an identifier that enables a verifiable, decentralized digital identity for a subject (e.g., a person, organization, thing, etc.). For example, a DID 236 can be used to represent the identity of a user, a computing device, or other objects. An individual can have multiple DIDs 236. For example, a user might use a first decentralized identifier 236 to manage their work-related identity and a second decentralized identifier 236 to manage their personal identity outside of work. In some instances, a DID 236 could be created and stored on a publicly accessible distributed ledger (e.g., a blockchain network) or a DID 236 could be created and stored on the client device 209 for sharing directly with peer devices or peer services, in which case the DID 236 can be referred to as a peer DID 236. Each DID 236 can include one or more DID document identifiers 249. A DID document identifier 249 can include any identifier that uniquely identifies a DID document 253 with respect to another DID document 253. In some implementations, the DID 236 can be implemented using various standards, such as a version of the World Wide Web Consortium's (W3C's) Decentralized Identifier (DID) standard.

A DID document 253 is a document which describes how to interact with the owner of the DID 236. For example, the DID document 253 can describe the mechanisms by which a subject of a DID 236 can authenticate itself or prove its association with the DID 236. This can include identifying the cryptographic public keys corresponding to the cryptographic private keys held by the subject of a DID 236. In some implementations, the DID document 253 can be implemented using various standards, such as a version of the W3C's Decentralized Identifier (DID) standard.

A verifiable credential 233 represents a credential issued by an issuer service 223 to the wallet application 246 of the user, which can store the verifiable credential 233 on the client device 209. Verifiable credentials 233 can be represented, for example, using JavaScript Object Notation (JSON) objects or files. A verifiable credential 233 can include various fields or data, such as the issuer of the verifiable credential 233, the subject of the verifiable credential 233, the type of credential, etc. Fields such as those representing the issuer or subject of the verifiable credential 233 could have a respective DID 236 specified as the identifier of the issuer or subject. For example, a first DID

236 could be included in the verifiable credential 233 to identify the user of the client device 209 and a second DID 236 could be included in the verifiable credential 233 that identifies the issuer device 206 or issuer service 223 that issued the verifiable credential 233. In some implementations, verifiable credentials 233 could be implemented using a standard, such as a version of the W3C's "Verifiable Credentials Data Model."

As discussed previously, a verifiable credential 233 can store various information for authentication purposes in various embodiments of the present disclosure. For example, a verifiable credential 233 could store a list of questions and/or authentication mechanisms and answers to the list of questions or information for enforcing the authentication mechanisms. For instance, a verifiable credential 233 could contain a list of personal questions that only the individual identified by the DID 236 that the verifiable credential 233 is issued to should be able to answer, as well as the answers to the respective questions. As another example, a verifiable credential 233 could contain a seed value for a one-time password authentication algorithm (e.g., TOTP or HOTP), which could be used to generate one-time passwords on behalf of the individual with whom the DID 236 is associated.

It should be noted that although the DIDs 236 and DID documents 253 illustrated are stored locally on client devices 209, DIDs 236 and/or DID documents 253 could be stored in publicly available databases or ledgers, such as decentralized distributed ledgers (e.g., public blockchains such as ETHEREUM®). However, DIDs 236 and DID documents 253 can be stored locally on client devices 209 to allow for additional privacy for the user.

Figure 3:
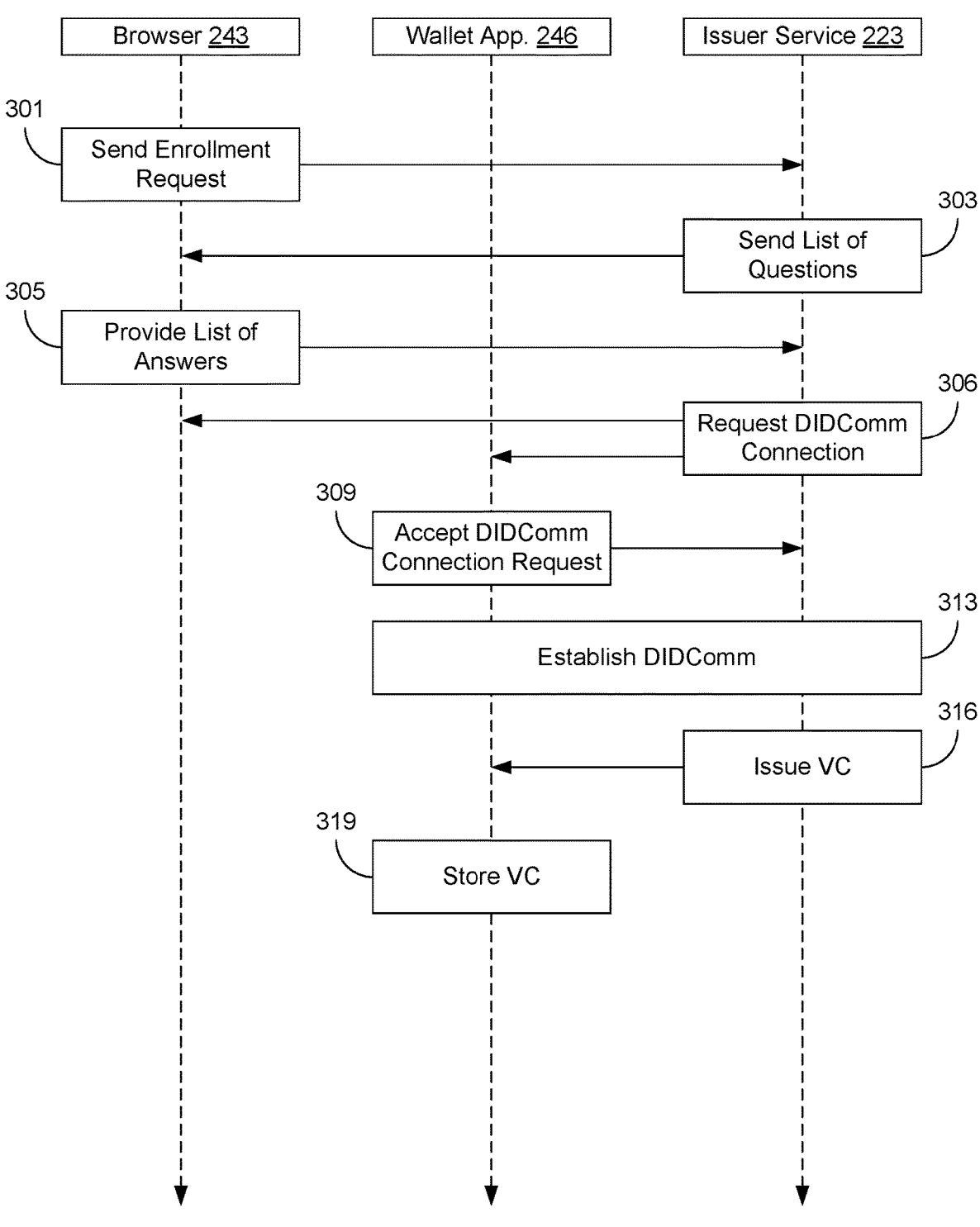
FIG. 3 is a sequence diagram illustrating one example of interactions between applications executed in a computing environment in the network environment of FIG. 2 according to various embodiments of the present disclosure.

Referring next to FIG. 3, shown is a sequence diagram that provides one example of the interactions between the browser 243, wallet application 246, and issuer service 223. The sequence diagram of FIG. 3 provides merely an example of the many different types of interactions between the browser 243, wallet application 246, and issuer service 223. As an alternative, the sequence diagram of FIG. 3 can be viewed as depicting an example of elements of a method implemented within the network environment 200.

Beginning with block 301, a user of a client device could use the browser 243 to send a request for a verifiable credential 233 to the issuer service 223. The request for the verifiable credential 233 could act as an enrollment request to participate in an authentication mechanism for the web application 216 provided by the issuer service 223. For example, the issuer service 223 could provide a web-based portal where a user could provide personally identifying information to the issuer service 223 to be used for a verifiable credential. As another example, the issuer service 223 could provide a web-based portal where a user could authenticate himself or herself in order to request that a verifiable credential 233 be issued on his or her behalf based at least in part on information know or available to the issuer service 223.

In response, at block 303, the issuer service 223 could select and send a set of questions to the browser 243. The questions could be randomly generated (e.g., through the use of a large language model (LLM) or other generative artificial intelligence techniques), could be predefined, or could be randomly selected from a predefined set or subset of questions (e.g., a random selection of X out of Y questions). Questions could be randomly generated with an using generative artificial intelligence, for example, to avoid repetitively using the same questions with multiple users, which could allow attackers to predict the questions a user would select and research potential answers to the questions.

Alternatively, at block 303, the issuer service 223 could request that the browser 243 provide both the questions and the answers to the questions. For example, a user could be prompted to invent, provide, or otherwise come up with their own questions. This could be done, for example, to avoid repetitively using the same questions with multiple users, which could allow attackers to predict the questions a user would select and research potential answers to the questions.

One example of a question is any question that only the user of the browser 243 is likely to know the answer to. These could include personally identifying questions or questions with a prompt that would likely only be answerable by the user in context (e.g., "Who was your crush?" or "Who was your favorite elementary school teacher?" or "What was your favorite subject in high school?" or "What is your pet's favorite food?" or "What type of laptop did you use to answer this question?" or "What is your spouse's favorite poem?"). Another example of a question is any request for information that could be used to setup a secondary authentication scheme. For example, a first question could ask whether a user wishes to enable the use of a one-time password and additional questions could ask a seed value for a one-time password algorithm (e.g., a time-based one-time password (TOTP) algorithm or a hash-based message authentication code (HMAC) one-time password (HOTP) algorithm) and/or one or more verification codes values to verify the seed value.

Accordingly, at block 305, the browser 243 can present the questions to the user and obtain answers from the user, or obtain both user created questions and user provided answers to the user created questions. The browser 243 can then return the answers to the questions to the issuer service 223.

In response, at block 306, the issuer service 223 could make a request to establish a DIDcomm connection with the wallet application 246 of the user. For example, the issuer service 223 could send a matrix bar code (e.g., a quick response (QR) code) to the browser 243, which the browser could show on a display of a client device 209. As another example, the issuer service 223 could send a connection message or request to the browser 243, which could then relay or pass on the message to a wallet application 246 executed by the client device 209. In response, the wallet application 246 could display a prompt, or cause the browser 243 to display a prompt, such as prompt 103*e*, to obtain the approval of the user to establish the connection between the wallet application 246 and the issuer service 223.

At block 309, the user could use his or her wallet application 246 to accept the DIDcomm connection request. For example, the user could use his or her wallet application on a second client device 209 to scan the matrix bar code shown on the display of the client device 209 that is executing the browser 243 in order to accept the DIDComm request. As another example, the user could approve the connection request using a prompt shown by the wallet application 246 or the browser 243. Other approaches for accepting or approving a DIDcomm connection between the issuer service 223 and the wallet application 246 according to various embodiments of the present disclosure.

Proceeding to block 313, the wallet application 246 and the issuer service 223 can establish a DIDcomm connection in response to the user approving or consenting to the connection using the wallet application 246 at block 309. This can be accomplished according to the specification of any version of the DIDcomm protocol as published by the Decentralized Identity Foundation (DIF).

Moving to block 316, the issuer service 223 can create and issue a verifiable credential 233 for the user and provide the verifiable credential 233 to the wallet application 246. The verifiable credential 233 could be created to comply with a form or format specified by a version of the W3C's "Verifiable Credentials Data Model." As part of the issuance process, the issuer service 223 could sign the verifiable credential 233 with the issuer private key 229 in order to allow third parties to confirm that the verifiable credential 233 was issued by the issuer service 223. The verifiable credential 233 could also include the issuer DID 221 associated with the issuer service 223, which could allow others to identify or otherwise determine which issuer service 223 issued an individual verifiable credential 233. The verifiable credential 233 could also include the DID 236 of the individual or entity identified by the verifiable credential 233.

The verifiable credential 233 could represent the questions presented to the user at block 303 and the answers received from the user at block 305. Accordingly, the content or text of each question, and its respective answer, could be stored in or represented by the verifiable credential 233. As discussed later, when a user is presented with one or more questions to authenticate himself or herself, the user could select the verifiable credential using his or her wallet application 246 and have the wallet application 246 provide the appropriate answers. This could include providing an answer to a question or an appropriate code or value as a one-time password.

Subsequently, at block 319, the wallet application 246 can store the verifiable credential 233 issued by the issuer service 223 on the client device 209. The wallet application 246 can, in some implementations, store the verifiable credential in a secure storage area (e.g., provided by a secure enclave of the client device) or in an encrypted form in order to prevent unauthorized use of the verifiable credential 233.

Figure 4:
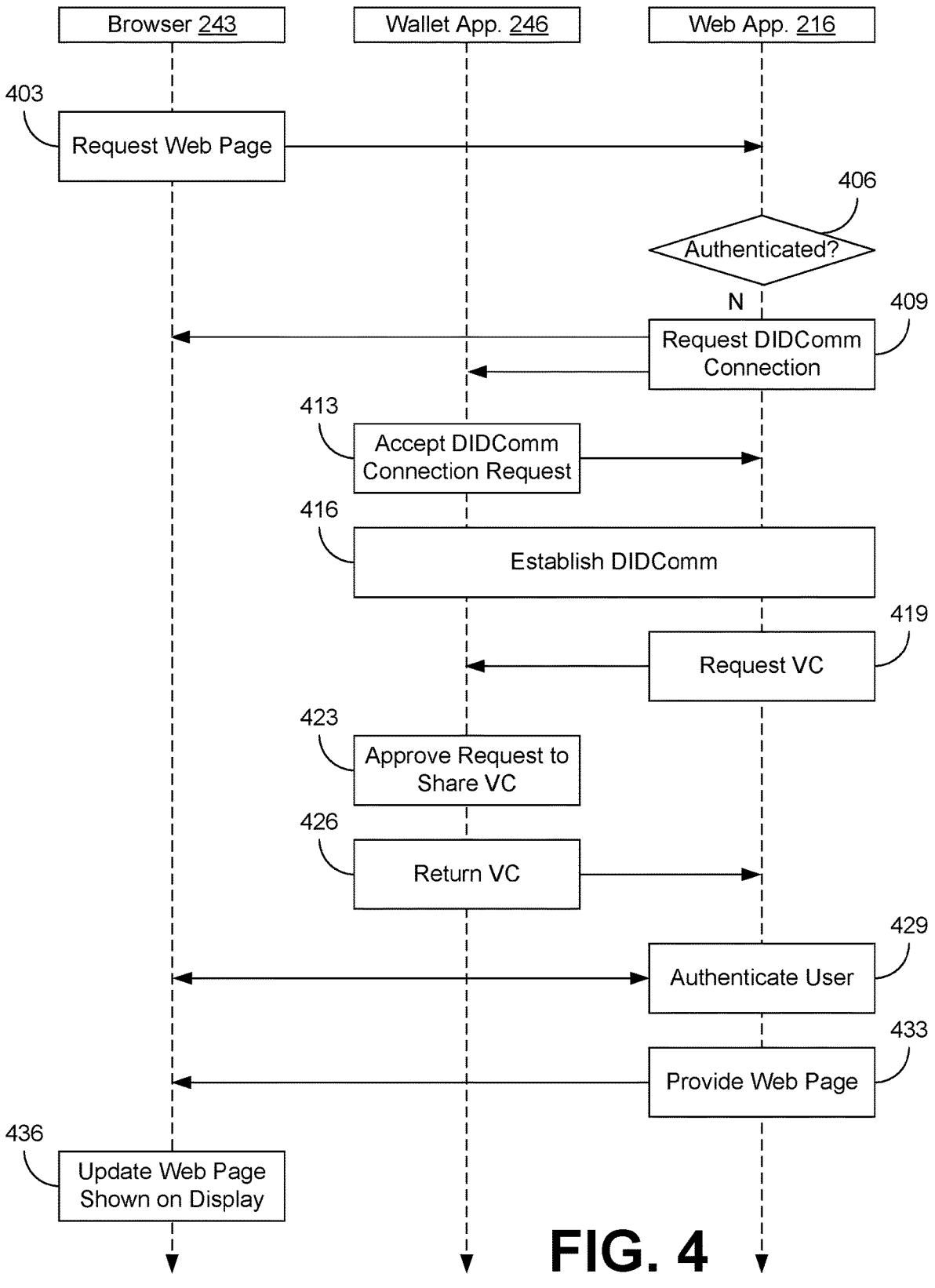
FIG. 4 is a sequence diagram illustrating one example of interactions between applications executed in a computing environment in the network environment of FIG. 2 according to various embodiments of the present disclosure.

Referring next to FIG. 4, shown is a sequence diagram that provides one example of the interactions between the browser 243, wallet application 246, and web application 216. The sequence diagram of FIG. 4 provides merely an example of the many different types of interactions between the browser 243, wallet application 246, and web application 216. As an alternative, the sequence diagram of FIG. 4 can be viewed as depicting an example of elements of a method implemented within the network environment 200.

Beginning with block 403, the browser 243 can send a request for a webpage to the web application 216. In response to the request, the web application 216 can, at block 406, determine if the user of the browser 243 has been authenticated already. For example, the web application 216 could determine whether the browser has an appropriate session identifier, cookie, or token to indicate that the browser 243 has been previously authenticated by the web application 216. If the browser 243 has been previously authenticated, the process could proceed instead to block 433. However, if the browser 243 has not been previously authenticated, then the process could instead proceed to block 409.

Next, at block 409, the web application 216 can make a request to establish a DIDcomm connection with the wallet application 246 of the user. For example, the web application 216 could send a matrix bar code (e.g., a quick response (QR) code) to the browser 243, which the browser 243 could show on a display of a client device 209. As another example, the issuer service 223 could send a connection message or request to the browser 243, which could then relay or pass on the message to a wallet application 246 executed by the client device 209. In response, the wallet application 246 could display a prompt, or cause the browser 243 to display a prompt, such as prompt 103e, to obtain the approval of the user to establish the connection between the wallet application 246 and the issuer service 223.

Accordingly, at block 413, the user could use his or her wallet application 246 to accept the DIDcomm connection request. For example, the user could use his or her wallet application on a second client device 209 to scan the matrix bar code shown on the display of the client device 209 that is executing the browser 243 in order to accept the DID-Comm request. As another example, the user could approve the connection request using a prompt (e.g., the prompt 103e) shown by the wallet application 246 or the browser 243. Other approaches for accepting or approving a DIDcomm connection between the issuer service 223 and the wallet application 246 according to various embodiments of the present disclosure.

Proceeding to block 416, the wallet application 246 and the web application 216 can establish a DIDcomm connection in response to the user approving or consenting to the connection using the wallet application 246 at block 413. This can be accomplished according to the specification of any version of the DIDcomm protocol as published by the Decentralized Identity Foundation (DIF).

Moving on to block 419, the web application 216 can request a verifiable credential 233 from the wallet application 246. This could be done using one or more of several approaches. In a first approach, the web application 216 could send a request for a verifiable credential 233 via the DIDcomm connection. This request could cause the wallet application 246 to prompt the user to select a verifiable credential 233 from one or more verifiable credentials 233 stored on the client device 209 of the user. In a second approach, the web application 216 could request a specific verifiable credential 233. This could be done, for example, by identifying the issuing entity of a specific verifiable credential 233. For instance, if the web application 216 and the issuer service 223 were operated by the same entity, the web application 216 could provide the issuer DID 221 of the issuer service 223 or issuer public key 226 of the issuer service 223 to the wallet application 246 as a mechanism for selecting a verifiable credential 233 that had been previously issued by the operator of the web application 216. This would allow the wallet application 246 to select a verifiable credential 233 issued by the issuer service 223 identified by the issuer DID 221 or issuer public key 226. In a similar example, the web application 216 could provide the set of issuer DIDs 221 or set of issuer public keys 226 included in the list of trusted issuers 219. This would act as a request for any verifiable credential 233 that had been issued by an issuer service 223 that was trusted by the web application 216.

Moreover, the request for the verifiable credential 233 could provide information regarding which questions and answers are to be used for authentication purposes. For example, the request for the verifiable credential 233 could request that a subset of the answers that form the verifiable credential be shared (e.g., if the verifiable credential 233 represents the answers to X questions, then A of X answers could be requested). As another example, the request for the verifiable credential 233 could specify which answers are to be provided (e.g., if the verifiable credential 233 represents five answers to five questions, the request could specify questions two and four be provided).

Then, at block 423, the wallet application 246 could approve the request to share a verifiable credential 233 with the web application. For example, the user could select within the wallet application 246 a specific verifiable credential 233 that the user wished to share with the web application 216. As another example, the user could review one or more verifiable credentials 233 identified by the web application 216 and select which verifiable credential(s) 233 to share with the web application 216. Moreover, the user could select which questions are to be used for authentication and/or which answers he or she is willing to share with the web application 216.

Next, at block 426, the wallet application 246 can return the verifiable credential(s) 233 selected and approved by the user. For example, the wallet application 246 could return the answers selected and/or approved by the user to the questions requested by the web application 216 or specified by the user. In some instances, the wallet application 246 could also indicate which questions the answers correspond to and/or provide the questions themselves. The verifiable credential(s) 233 could be returned using the same DID-comm connection that was established at block 416.

Accordingly, at block 429, the web application 216 can authenticate the user of the browser 243 based at least in part on the verifiable credential 233 provided at block 426. First, the web application 216 can determine which questions of the verifiable credential 233 the user has shared with his or her wallet application 246. The web application 216 could then present these questions to the browser 243 for the user of the browser 243 to answer. The web application 216 could then compare the answers provided by the browser 243 to the answers received from the wallet application 246. If the answers match, then the web application 216 can determine that the user of the browser 243 is also the owner or otherwise in control of the wallet application 246 that shared the verifiable credential 233. In the case of a one-time password, the seed value provided by the verifiable credential 233 could be used to determine if a one-time password provided by the browser 243 is correct.

After the user has been authenticated, the web application 216 can, at block 433, provide the requested web page to the browser 243 or allow the requested operation (e.g., electronic payment) to be performed. The web application 216 could also provide session identifier, cookie, or token to the browser 243 to allow it to remain authenticate with the web application 216 for a predefined period of time. Moreover, the web application 216 could, in some implementations, delete or otherwise remove any information related to the verifiable credentials 233 from its memory in order to minimize the risks of any potential compromise of the system.

Subsequently, at block 436, the browser 243 can update the web page displayed to the user to show the content of the web page to the user.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random-access portion of the memory and run by the processor, source code that can be expressed in proper format such as object code that is capable of being loaded into a random-access portion of the memory and executed by the processor, or source code that can be interpreted by another executable program to generate instructions in a random-access portion of the memory to be executed by the processor. An executable program can be stored in any portion or component of the memory, including random-access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random-access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random-access memory (SRAM), dynamic random-access memory (DRAM), or magnetic random-access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random-access memory (RAM) including static random-access memory (SRAM) and dynamic random-access memory (DRAM), or magnetic random-access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
   a computing device comprising a processor and a memory; and
   machine-readable instructions stored in the memory that, when executed by the processor, cause the computing device to at least:
   receive an enrollment request from a browser;
   in response to the enrollment request, select a set of authentication questions by using a generative artificial intelligence to select the set of authentication questions to be different from a previous set of authentication questions sent to a previous user;
   send the set of authentication questions to the browser;
   receive a set of answers to a subset of the set of authentication questions;
   establish a decentralized identifier communication (DIDComm) protocol connection with a wallet application; and
   issue, to the wallet application, a verifiable credential that comprises the set of answers to the subset of the set of authentication questions, the issuance comprising transmitting the verifiable credential to the wallet application via the DIDComm protocol.

2. The system of claim 1, wherein the subset of the set of authentication questions is a first subset, and the machine-readable instructions are a first set of machine-readable instructions, and the system further comprises a second set of machine readable instructions that cause the computing device to at least:
   receive an authentication request from the browser;
   send an authentication challenge to the wallet application, the authentication challenge identifying a second subset of the set of authentication questions;
   receive from the wallet application an authentication response comprising a subset of the set of answers corresponding to the second subset of the set of authentication questions; and
   verify the subset of the set of answers.

3. The system of claim 2, wherein the authentication challenge is a first authentication challenge, the authentication response is a first authentication response, and the second set of machine-readable instructions further cause the computing device to at least:
   send a second authentication challenge to the browser, the second authentication challenge identifying the second subset of the set of authentication questions;
   receive from the browser a second authentication response comprising the subset of the set of answers corresponding to the second subset of the set of authentication questions;
   determine that the subset of the set of answers received from the browser in the second authentication response matches the subset of the set of answers received from the wallet application in the first authentication response; and authorize the authentication request in response to the determination that the subset of the set of answers received from the browser in the second authentication response matches the subset of the set of answers received from the wallet application in the first authentication response.

4. The system of claim 2, wherein the second set of machine-readable instructions further cause the computing device to at least randomly select authentication questions from the set of authentication questions to generate the second subset of the set of authentication questions.

5. The system of claim 1, wherein at least one of the authentication questions in the set of authentication questions complies with a time-based one-time password (TOTP) algorithm.

6. The system of claim 1, wherein at least one of the authentication questions in the set of authentication questions complies with a hash-based message authentication code (HMAC) one-time password (HOTP) algorithm.

7. The system of claim 1, wherein the generative artificial intelligence is a large language model (LLM) and the machine readable instructions that cause the computing device to select the subset of authentication questions further cause the computing device to randomly generate the authentication questions using the LLM.

8. A method implemented by a computing device, comprising:

receiving an enrollment request from a browser;

in response to the enrollment request, selecting a set of authentication questions by using a generative artificial intelligence to select the set of authentication questions to be different from a previous set of authentication questions sent to a previous user;

sending the set of authentication questions to the browser;

receiving a set of answers to a subset of the set of authentication questions;

establishing a decentralized identifier communication (DIDComm) protocol connection with a wallet application; and issuing, to the wallet application, a verifiable credential that comprises the set of answers to the subset of the set of authentication questions, the issuance comprising transmitting the verifiable credential to the wallet application via the DIDComm protocol.

9. The method of claim 8, wherein the subset of the set of authentication questions is a first subset, and the method further comprises:

receiving an authentication request from the browser;

sending an authentication challenge to the wallet application, the authentication challenge identifying a second subset of the set of authentication questions;

receiving from the wallet application an authentication response comprising a subset of the set of answers corresponding to the second subset of the set of authentication questions; and verifying the subset of the set of answers.

10. The method of claim 9, wherein the authentication challenge is a first authentication challenge, the authentication response is a first authentication response, and the method further comprises:

sending a second authentication challenge to the browser, the second authentication challenge identifying the second subset of the set of authentication questions;

receiving from the browser a second authentication response comprising the subset of the set of answers corresponding to the second subset of the set of authentication questions;

determining that the subset of the set of answers received from the browser in the second authentication response matches the subset of the set of answers received from the wallet application in the first authentication response; and authorizing the authentication request in response to the determination that the subset of the set of answers received from the browser in the second authentication response matches the subset of the set of answers received from the wallet application in the first authentication response.

11. The method of claim 9, further comprising randomly selecting authentication questions from the set of authentication questions to generate the second subset of the set of authentication questions.

12. The method of claim 8, wherein at least one of the authentication questions in the set of authentication questions complies with a time-based one-time password (TOTP) algorithm.

13. The method of claim 8, wherein at least one of the authentication questions in the set of authentication questions complies with a hash-based message authentication code (HMAC) one-time password (HOTP) algorithm.

14. The method of claim 13, wherein selecting the subset of authentication questions further comprises randomly generating the authentication questions using a large language model (LLM).

15. A non-transitory, computer-readable medium comprising machine-readable instructions that, when executed by a processor of a computing device, further cause the computing device to at least:

receive an enrollment request from a browser;

in response to the enrollment request, select a set of authentication questions by using a generative artificial intelligence to select the set of authentication questions to be different from a previous set of authentication questions sent to a previous user;

send the set of authentication questions to the browser;

receive a set of answers to a subset of the set of authentication questions;

establish a decentralized identifier communication (DIDComm) protocol connection with a wallet application; and issue, to the wallet application, a verifiable credential that comprises the set of answers to the subset of the set of authentication questions, the issuance comprising transmitting the verifiable credential to the wallet application via the DIDComm protocol.

16. The non-transitory, computer-readable medium of claim 15, wherein the subset of the set of authentication questions is a first subset, and the machine-readable instructions are a first set of machine-readable instructions, and the non-transitory, computer-readable medium further comprises a second set of machine readable instructions that cause the computing device to at least:

receive an authentication request from the browser;

send an authentication challenge to the wallet application, the authentication challenge identifying a second subset of the set of authentication questions;

receive from the wallet application an authentication response comprising a subset of the set of answers corresponding to the second subset of the set of authentication questions; and verify the subset of the set of answers.

17. The non-transitory, computer-readable medium of claim 16, wherein the authentication challenge is a first authentication challenge, the authentication response is a first authentication response, and the second set of machine-readable instructions further cause the computing device to at least:

send a second authentication challenge to the browser, the second authentication challenge identifying the second subset of the set of authentication questions;

receive from the browser a second authentication response comprising the subset of the set of answers corresponding to the second subset of the set of authentication questions;

determine that the subset of the set of answers received from the browser in the second authentication response matches the subset of the set of answers received from the wallet application in the first authentication response; and authorize the authentication request in response to the determination that the subset of the set of answers received from the browser in the second authentication response matches the subset of the set of answers received from the wallet application in the first authentication response.

18. The non-transitory, computer-readable medium of claim 16, wherein the second set of machine-readable instructions further cause the computing device to at least randomly select authentication questions from the set of authentication questions to generate the second subset of the set of authentication questions.

19. The non-transitory, computer-readable medium of claim 15, wherein at least one of the authentication questions in the set of authentication questions complies with a time-based one-time password (TOTP) algorithm or a hash-based message authentication code (HMAC) one-time password (HOTP) algorithm.

20. The non-transitory, computer-readable medium of claim 15, wherein the generative artificial intelligence is a large language model (LLM) and the machine readable instructions that cause the computing device to select the subset of authentication questions further cause the computing device to randomly generate the authentication questions using LLM.

* * * * *